United States Patent [19]

Ebi et al.

[11] 4,419,673

[45] Dec. 6, 1983

[54] INK DROPLET EJECTION SYSTEM

[75] Inventors: Yutaka Ebi; Akinori Mizuno, both of Tokyo, Japan

[73] Assignee: Ricoh Company, Ltd., Tokyo, Japan

[21] Appl. No.: 308,019

[22] Filed: Oct. 2, 1981

[30] Foreign Application Priority Data

Oct. 10, 1980 [JP] Japan ................................ 55-141608

[51] Int. Cl.$^3$ ............................................ G01D 15/18

[52] U.S. Cl. .................................. 346/75; 346/140 R

[58] Field of Search ............... 346/75, 140 PD, 140 IJ

[56] References Cited

U.S. PATENT DOCUMENTS 3,270,637 10/1963 Clark ............................ 346/140 PD 3,747,120 7/1973 Stemme ................................ 346/75

3,946,398 3/1976 Kyser et al. ...................... 346/75 X 4,045,801 8/1977 Iwasaki ........................ 346/140 PD 4,180,225 12/1979 Yamada ................................ 346/75

4,228,440 10/1980 Horike et al. ......................... 346/75

*Primary Examiner*—Joseph W. Hartary

*Assistant Examiner*—D. Jennings

*Attorney, Agent, or Firm*—David G. Alexander

[57] ABSTRACT

An ink droplet ejection system includes a pair of electrodes located in the vicinity of an ejection nozzle which defines an outlet of an ink supply passageway. An electric field is applied periodically to an ink fed under pressure to the nozzle in a direction perpendicular to or parallel with the direction of ink flow, so that a continuous stream of ink ejected from the nozzle is separated into successive droplets.

7 Claims, 9 Drawing Figures

INK DROPLET EJECTION SYSTEM

BACKGROUND OF THE INVENTION

The present invention generally relates to fluid droplet ejection systems and, more particularly, to a new and simple ink droplet ejection system for an ink jet printer or the like which can eject droplets of ink without using a vibrator.

Various propositions have hitherto been presented in connection with ink jet printers. Archetypes of most of known ink jet recorders are a so-called Stemme type ink jet printer represented by U.S. Pat. No. 3,747,120 and a Silonics type ink jet printer represented by U.S. Pat. No. 3,946,398. These two types of ink jet recorders commonly include a vibrator which is operably mounted on an ink ejection head. Vibration of this vibrator causes the velocity or pressure of an ink inside the ejection head to vary so that a droplet is separated from a continuous stream of ink being ejected from the ejection head.

Such an ink droplet ejection system, however, cannot be freed from uneven energy distributions to the liquid due to the use of a vibrator, unless the force acting on the vibrator are duely adjusted and controlled. Unevenness is also encountered in the electromechanical convertion efficiencies of vibrators themselves. The result is inconstant intervals between adjacent ones of successive ink droplets. Meanwhile, the construction is so intricate that a force initially acting on the vibrator must be adjusted and care must be taken to avoid interactions between the vibrator and a vibrator retaining member or those between the liquid and the vibrator retaining member.

SUMMARY OF THE INVENTION

It is an object of the present invention to provide a new fluid droplet ejection system which is simple in construction and capable of ejecting fluid droplets at a constant spacing without resort to a vibrator.

It is another object of the present invention to overcome the drawbacks inherent in the prior art ink jet printer by employing a new ink jet ejection system which is entirely different from that of the prior art ink jet printers.

It is another object of the present invention to provide an ink droplet ejection system for an ink jet printer which can eject droplets of ink efficiently from a nozzle of an ink ejection head.

It is another object of the present invention to provide an ink droplet ejection system for an ink jet printer which, in pressurizing an ink inside an ink ejection head to eject ink droplets from its nozzle, effectively prevents the ink in the ejection head from being allowed to flow backward into an ink inlet passageway by the pressurization.

It is another object of the present invention to provide a generally improved ink droplet ejection system for an ink jet printer.

Other objects, together with the foregoing, are attained in the embodiments described in the following description and illustrated in the accompanying drawings.

DESCRIPTION OF THE PREFERRED EMBODIMENTS

While the ink droplet ejection system for an ink jet printer of the present invention is susceptible of numerous physical embodiments, depending upon the environment and requirements of use, substantial numbers of the herein shown and described embodiments have been made, tested and used, and all have performed in an eminently satisfactory manner.

Figure 1:
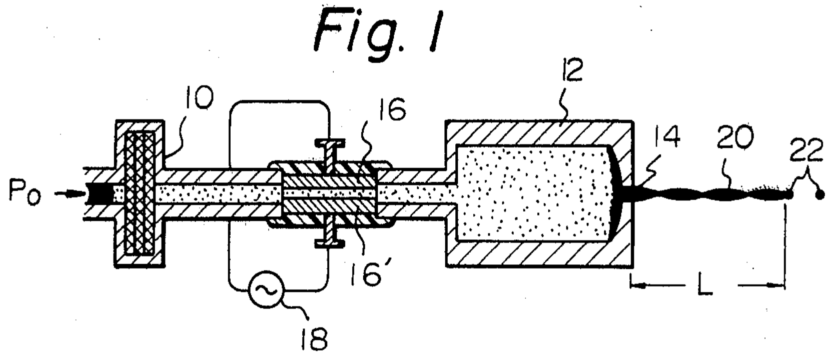
FIG. 1 is a fragmentary sectional side elevation of an ink jet printer representing an ink droplet ejection system embodying the present invention.

Referring to FIG. 1 of the drawings, an ink droplet ejection device of an ink jet printer to which the present invention is applicable is shown. The ejector includes a filter 10 located in a predetermined ink inlet passageway to filter an inflow of ink and an ink ejection head 12 having an ejection port or nozzle 14. In accordance with the present invention, a pair of electrodes 16, 16' are interposed between the filter 10 and ejection head 12 and connected with an AC power source 18. The electrodes 16, 16' are so arranged as to periodically apply a variable electric field to the ink flow from the filter 10 to the head 12 in perpendicular relation thereto. Between the electrodes 16, 16', the ink supplied under a predetermined pressure $P_O$ via the filter 10 has its viscosity and, therefore, its velocity is varied by the electric field applied across the electrodes 16, 16'. The velocity of the ink decreases as the viscosity increases but increases as the latter decreases, thereby causing the ink pressure inside the ejection head to vary. The reference numeral 20 denotes a continuous stream of ink which will be separated into a droplet 22 as will be described.

Figure 2:
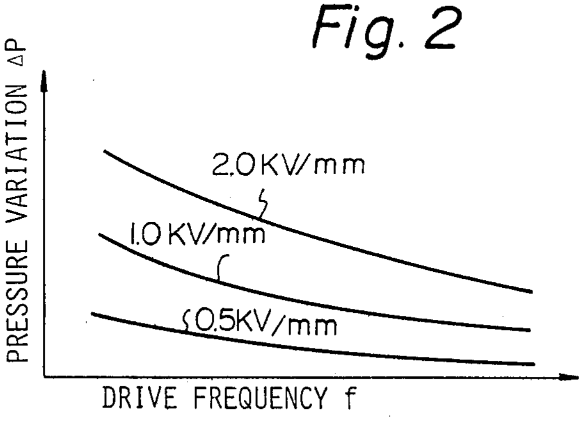
FIG. 2 is a graph showing a relationship between a drive frequency of an AC electric field applied in the ink droplet ejection system of FIG. 1 and a pressure variation inside the ink ejection head.

FIG. 2 shows curves representing a relation between a pressure variation $\Delta P$ in the ejection head 12 and a frequency f of the AC electric field developed between the electrodes 16, 16' and having a sinusoidal waveform, with respect to three different intensities of electric field, 2.0 KV/mm, 1.0 KV/mm and 0.5 KV/mm. It will be seen from the curves that the pressure variation $\Delta P$ in the ejection head 12 is generally inversely proportional to the frequency f of the electric field provided by a sinusoical wave. The waveform of the electric field across the electrodes 16, 16' is not limited to the sinusoidal wave but may comprise a triangular wave, a rectangular wave, a saw-toothed wave, a repetitive pulse wave or the like.

Figure 3:
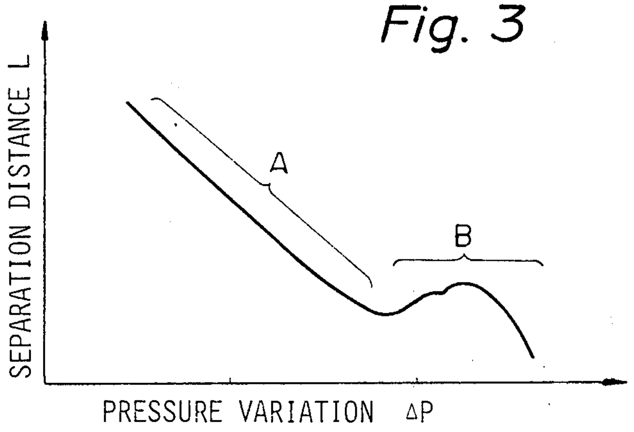
FIG. 3 is a graph showing a relationship between a pressure variation inside the ejection head shown in FIG. 1 and a distance from the ejection head to a point at which a continuous stream of ink separates into a droplet.

Referring to FIG. 3, there is shown a graph which indicates a relationship between a pressure variation $\Delta P$ in the ejection head 12 and a distance L from the front end of the ejection head to a point where a droplet 22 becomes separated from the continuous ink stream 20. Using a logarithmic representation for the abscissa, it was proved that the relation includes a linear portion A and a non-linear portion B as illustrated.

Thus, when a flow of ink supplied to the ejection head 12 under pressure is subjected to the periodically varied electric field which is perpendicular to the ink flow, its velocity is varied to in turn vary the pressure inside the ejection head 12. A variation in the pressure inside the head 12 drives the ink stream 20 ejected from the head 12 so that the ink stream 20 is separated into a droplet 22 in accordance with the drive frequency f of the periodically varied electric field.

Based upon the above-described principle, we obtained desirable ink droplets at constant intervals therebetween under experimental conditions in which the electrodes 16, 16' were spaced 0.5 mm from each other and applied with a voltage of 150 Vrms thereacross.

Figure 4:
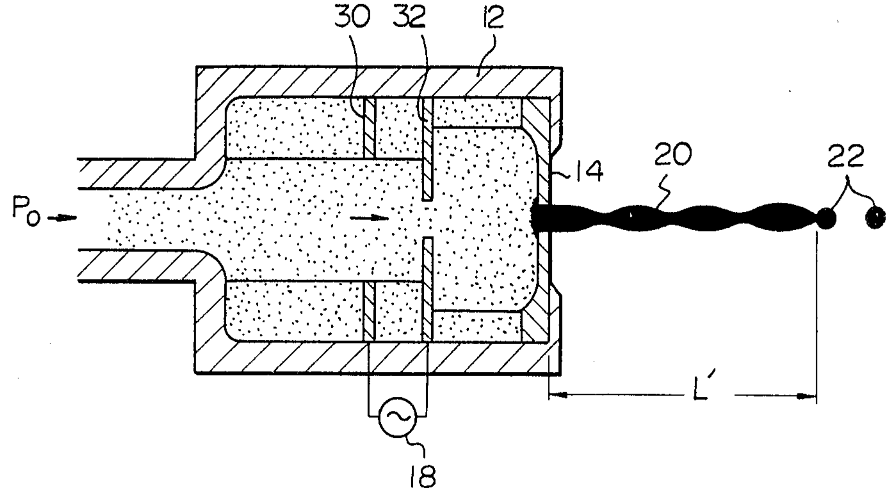
FIG. 4 is a fragmentary sectional side elevation of an ink jet printer representing another embodiment of the present invention.
Figure 5:
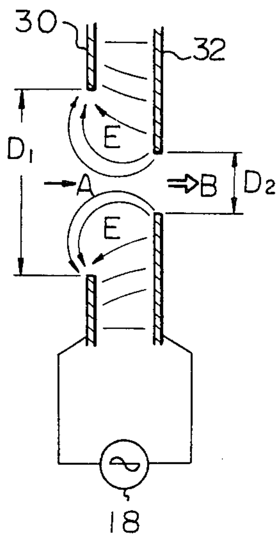
FIG. 5 is a diagram illustrating the operation of first and second apertured electrodes employing in the embodiment of FIG. 4.
Figure 6:
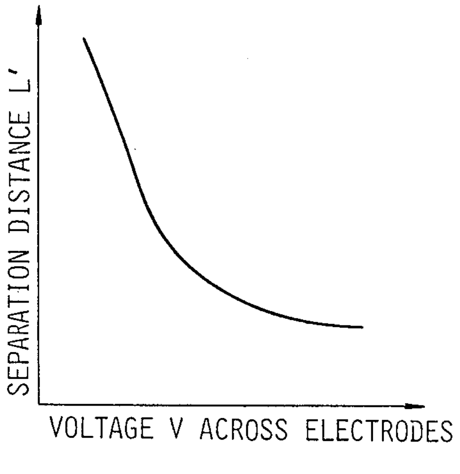
FIG. 6 is a graph showing a relationship between a voltage impressed across the electrodes of FIG. 4 and a distance at which a continuous stream of ink separates into a droplet.

FIGS. 4 to 6 illustrate another embodiment of the ink droplet ejection system of the present invention. In these drawings, the same parts and elements as those in FIG. 1 are denoted by the same reference numerals.

Referring to FIGS. 4 to 6, the system differs from the preceding system in that the electrode pair 16, 16' is replaced by a first apertured electrode 30 and a second apertured electrode 32 arranged in succession. An ink is supplied to the ink ejection head 12 under a predetermined pressure $P_O$. The first and second apertured electrodes 30 and 32 are positioned inside the ejection head 12 at a predetermined spacing along the direction of the ink flow. A periodically variable electric field is developed between the opposite electrodes 30, 32 in parallel with the direction of ink flow. A force $\dot{F}$ which the electric field $\dot{E}$ exerts on the liquid in this case is generally expressed as $$\dot{F} = a \text{ grad } \dot{E}^2$$

or, if the electric field has an AC sinusoidal waveform, where a and a' are constants $$\dot{F} = a' \text{ grad } (\dot{E} \cos \omega t)^2$$

The force $\dot{F}$ acts on the ink along the direction of the ink flow to cause a small variation in the ink flow so that the continuous stream of ink 20 from the ejection head 12 is separated into a droplet 22 in accordance with the frequency of the AC electric field. Again, a triangular wave, a rectangular wave, a saw-toothed wave, a repetitive pulse wave or the like may be employed in place of the sinusoidal wave.

Electric lines of force developing in the neighborhood of the electrodes 30, 32 are demonstrated in FIG. 5. An arrow A in FIG. 5 indicates the flow direction of the ink. Suppose that the electrode 30 has an aperture having a diameter $D_1$ and the electrode 32 has an aperture having a diameter $D_2$ which is smaller than $D_1$. Then, the electric field E applies a force $\Delta P$ to the ink in the direction of an arrow B. This force $\Delta P$ is combined with the initial pressure $P_O$ to provide a composite ink pressure P, i.e., $P = P_O + \Delta P$. Supposing that an AC electric field is developed between the electrodes 30 and 32, the ink pressure P is expressed as $$P = P_0 + \Delta P$$
$$= P_0 + a' \, grad \, (\dot{E} \cos \omega t)^2.$$

This equation implies that the ink pressure within the ejection head 12 undergoes a small variation at a frequency corresponding to the frequency of the AC electric field. The ink stream 20 is thus separated into a droplet 22 as illustrated. FIG. 6 is a graph showing a relationship between an AC voltage applied across the electrodes 30, 32 and a distance L' to a point of separation of the ink stream into an ink droplet.

Figure 7:
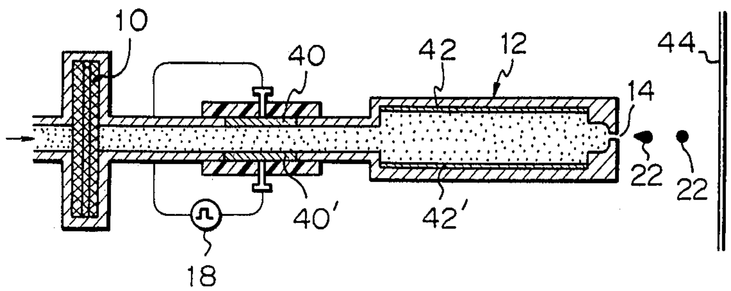
FIG. 7 is a fragmentary sectional side elevation of a conventional ink jet printer incorporating a part of an ink droplet ejection system of the present invention.
Figure 8:
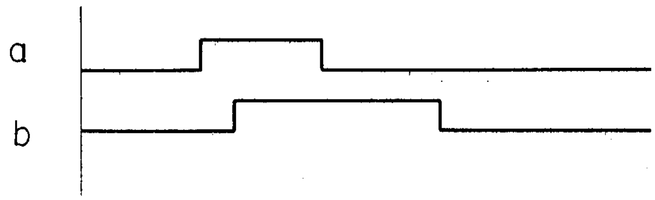
FIG. 8 is a timing chart demonstrating the operation of the embodiment shown in FIG. 7.
Figure 9:
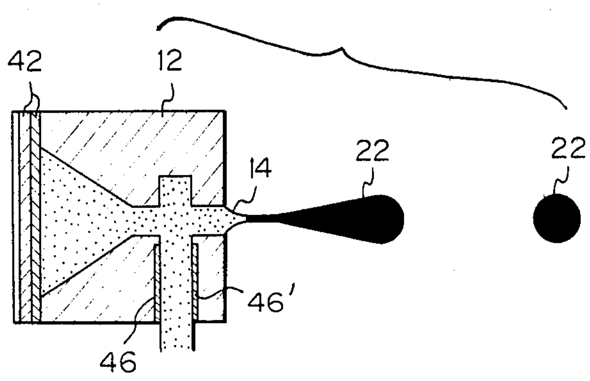
FIG. 9 is a fragmentary sectional side elevation showing a modification to the ink droplet ejection system of FIG. 7.

While the concept of the present invention has been shown and described as being embodied by itself, it may be applied to or used in combination with an ink droplet ejection device of the Stemme type of Silonics type ink jet printer. FIGS. 7 to 9 illustrate a prior art ink jet printer which incorporates the concept of the present invention, that is, provision of electrodes for applying an electric field to an ink flow. The same parts and elements as those of the foregoing embodiments are denoted by the same reference numerals.

Referring to FIGS. 7 to 9, the ink jet printer includes electrodes 40, 40' and an electrostrictive vibrator 42. The reference numeral 44 designates a recording medium in the form of a paper sheet. In this type of printer, the electrostrictive vibrator 42 is driven as usual in accordance with an input video signal so that the internal volume of the ejection head 12 is sharply reduced to eject an ink droplet from the nozzle 14 and thereby print a desired dot on the paper sheet 44. During this operation, it is necessary that a change in the volume of the ejection head 12 be transmitted efficiently to the nozzle 14 and that the ink supply to the ejection head 12 be carried out with efficiency. Such efficient transmission of a change of the head volume to the nozzle is unachievable with a prior art printer of this type, in which the change is transmitted back to the ink supply side of the printer. This has to be compensated for by the use of an electrostrictive vibrator capable of producing significant energy.

The printer shown in FIG. 7 succeeds in overcoming the drawback discussed above by employing the concept of the present invention. As shown, the electrode pair 40, 40 is located in a part of an ink supply passage to the ejection head 12. While the electrostrictive vibrator 42 is driven, a voltage is coupled across the electrodes 40, 40' to apply an electric field to the ink flowing therebetween. The resultant increase in the viscosity of the ink is reflected by an increase in the resistance to the flow of the ink between the electrodes 40, 40', thereby preventing a change of the head volume from escaping into the ink supply side of the printer. This ensures an improvement in the efficiency of the ink ejection from the nozzle 14.

The ink can be readily introduced into the ejection head 12 in the event of an ink supply by cutting off the voltage across the electrodes 40, 40' and thereby releasing the electric field to lower the resistance to the ink flow to the usual level. In practice, however, the ink cannot respond without a delay to the cut-off of the voltage supply. The delay can be made up for if a voltage is coupled across the electrodes 40, 40' initially, then a data signal is applied to the vibrator 42 and then the voltage supply across the electrodes 40, 40' is cut off to allow a supply of ink to the ejection head 12. Such sequential steps are represented by a timing chart in FIG. 8. As shown, a voltage is applied across the electrodes 40, 40' in response to a signal a, then the vibrator is driven by a signal b and then the signal b is turned off after the signal a.

Referring to FIG. 9, there is shown a modification to the ink droplet ejection system of FIG. 7. The same parts and elements as those in FIG. 7 are denoted by the same reference numerals. The modified system forms a part of a Stemme type ink jet printer typified by U.S. Pat. No. 3,747,120 in which an ink supply passage extends perpendicularly to the direction of ejection of ink droplets 22. As shown, a pair of electrodes 46, 46' are positioned in a part of the ink supply passageway as in the arrangement of FIG. 7. An electric field will be developed between the electrodes 46, 46' as has previously been described in connection with the arrangement of FIG. 7.

In summary, it will be seen that the present invention provides an ink droplet ejection system which, upon a sharp decrease in the internal volume of an ink ejection head, prevents the change of head volume from escaping back into an ink supply side and thereby promotes efficient transmission of such a change to the ink ejection head. Also, the system of the invention can eject ink droplets at constant intervals with a simple and economical construction.

It will be apparent that the system of the invention is applicable to a variety of other apparatus which need ejection of a stream of fine fluid droplets as well as to the ink jet printers shown and described.

Various modifications will become possible for those skilled in the art after receiving the teachings of the present disclosure without departing from the scope thereof.

What is claimed is:

1. A fluid droplet ejection system comprising:

a fluid inlet passageway supplied with fluid under pressure;

a fluid ejection head having a nozzle communicated with the inlet passageway for ejecting a stream of the fluid from the nozzle; and electric field applying means for periodically applying an electric field to the fluid in the inlet passageway to thereby separate the stream of the fluid from the nozzle into successive droplets;

the electric field being applied to the fluid in a direction perpendicular to an intended direction of fluid flow.

2. A system as claimed in claim 1, in which the electric field applying means comprises a pair of electrodes.

3. A system as claimed in claim 1, in which the electric field applying means is energized by an AC power source.

4. A system as claimed in claim 2, in which the electric field is developed across the electrodes by a voltage having one of a sinusoidal waveform, a triangular waveform, a rectangular waveform, a saw-toothed waveform and a repetitive pulse waveform.

5. An ink jet droplet ejection system comprising:

an ink jet inlet passageway supplied with an ink under pressure;

an ink jet head having a nozzle communicated with the ink inlet passageway for ejecting a stream of the ink therefrom;

an electrostrictive vibrator for producing pressure vibration to cause ink ejected from the head to separate into a jet of droplets; and electric field applying means for periodically applying an electric field to the ink to thereby prevent the pressure vibration produced by the electrostrictive vibrator from being transmitted to the passageway.

6. A system as claimed in claim 5, in which the electric field applying means is disposed in the head between the passageway and the electrostrictive vibrator.

7. A system as claimed in claim 5, in which the passageway opens into the head between the electrostrictive vibrator and the electric field applying means.

* * * * *